United States Patent
Fujii

(10) Patent No.: US 10,639,753 B2
(45) Date of Patent: May 5, 2020

(54) MACHINE TOOL AND PLASTIC FORMING METHOD

(71) Applicant: FANUC CORPORATION, Yamanashi (JP)

(72) Inventor: Takaaki Fujii, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/175,025

(22) Filed: Oct. 30, 2018

(65) Prior Publication Data
US 2019/0126358 A1 May 2, 2019

(30) Foreign Application Priority Data
Nov. 1, 2017 (JP) ................................. 2017-211896

(51) Int. Cl.
*B23P 23/04* (2006.01)
*B23Q 15/007* (2006.01)
(Continued)

(52) U.S. Cl.
CPC ............ *B23P 23/04* (2013.01); *B21D 31/005* (2013.01); *B23P 9/02* (2013.01); *B23Q 15/007* (2013.01); *B23Q 15/14* (2013.01); *G05B 19/402* (2013.01)

(58) Field of Classification Search
CPC .......... B21J 5/008; B21D 31/005; B23P 9/00; B23P 9/02; B23P 23/04; B24B 39/04;
(Continued)

(56) References Cited

U.S. PATENT DOCUMENTS

| 6,216,508 B1 * | 4/2001 | Matsubara | B21D 22/00 72/125 |
| 6,971,256 B2 * | 12/2005 | Okada | B21D 22/14 72/115 |

(Continued)

FOREIGN PATENT DOCUMENTS

| CN | 104759962 A | 7/2015 |
| JP | 2003-039315 A | 2/2003 |

(Continued)

OTHER PUBLICATIONS

Notice of Reasons for Refusal issued by the Japanese Patent Office in relation to Japanese Application No. 2017-211896 dated Jun. 11, 2019 (3 pages) along with English language translatioin (3 pages).
(Continued)

*Primary Examiner* — Edward T Tolan
(74) *Attorney, Agent, or Firm* — Robert P. Michal, Esq.; Carter, DeLuca & Farrell LLP

(57) ABSTRACT

A machine tool provided with a tool spindle and a work table for supporting a workpiece for plastic forming on a workpiece with a tool attached to the tool spindle. The partially curved tool is has a moving mechanism to move the tool spindle relative to the workpiece, a spindle rotating motor to turn the tool spindle relative to the workpiece, a movement control unit to control the moving mechanism to move the tool along the workpiece while pressing a curved portion on the surface to be machined, and a turn control unit to control the spindle rotating motor to orient a normal line of the curved portion toward the surface of the workpiece at a reference position taken as a reference.

14 Claims, 9 Drawing Sheets

(51) Int. Cl.
*G05B 19/402* (2006.01)
*B23P 9/02* (2006.01)
*B23Q 15/14* (2006.01)
*B21D 31/00* (2006.01)

(58) Field of Classification Search
CPC .... B23Q 15/007; B23Q 15/013; B23Q 15/12; B23Q 15/14
See application file for complete search history.

(56) References Cited

U.S. PATENT DOCUMENTS

| | | | | |
|---|---|---|---|---|
| 8,302,442 B2* | 11/2012 | Kiridena | ................ | B21D 31/00 72/115 |
| 8,316,687 B2* | 11/2012 | Slattery | ................ | B21D 31/005 72/476 |
| 8,408,039 B2* | 4/2013 | Cao | ................ | B29C 59/022 72/379.2 |
| 8,578,748 B2* | 11/2013 | Huskamp | ................ | B21D 22/02 72/10.4 |
| 8,858,853 B2* | 10/2014 | Huskamp | ................ | B21D 22/18 264/219 |
| 9,682,418 B1* | 6/2017 | Young | ................ | B21J 5/008 |
| 2015/0343597 A1* | 12/2015 | von Schleinitz | ...... | B24B 39/045 384/456 |

FOREIGN PATENT DOCUMENTS

| | | |
|---|---|---|
| JP | 2005305604 A | 11/2005 |
| JP | 2009-166222 A | 7/2009 |
| JP | 2013-035089 A | 2/2013 |
| JP | 2013-180361 A | 9/2013 |

OTHER PUBLICATIONS

Decision to Grant a Patent issued by the Japanese Patent Office in relation to Japanese Application No. 2017-211896 dated Jun. 11, 2019 (3 pages) along with English language translatioin (2 pages).

* cited by examiner

MACHINE TOOL AND PLASTIC FORMING METHOD

CROSS-REFERENCE TO RELATED APPLICATION

This application is based upon and claims the benefit of priority from Japanese Patent Application No. 2017-211896 filed on Nov. 1, 2017, the contents of which are incorporated herein by reference.

BACKGROUND OF THE INVENTION

Field of the Invention

The present invention relates to a machine tool and a plastic forming method for machining a workpiece with a tool.

Description of the Related Art

Examples of mirror-finishing of a workpiece surface include machining a workpiece with a tool having a machining blade, grinding a workpiece with a buff, a grinding wheel or the like, plastically forming a workpiece with a tool having a curved portion, and the like. Among those mirror-finishing, a plastic forming for plastically deforming a workpiece is disclosed in Japanese Laid-Open Patent Publication No. 2003-039315. To describe it briefly, the workpiece is plastically deformed in such a manner that a pressing portion formed at an end portion of a mandrel is pressed on a surface of the workpiece to be machined and is moved while being rotated.

SUMMARY OF THE INVENTION

However, in the technology disclosed in Japanese Laid-Open Patent Publication No. 2003-039315, there occurs a case that vibration generated by the rotation of the mandrel being pressed on the surface of the workpiece to be machined is transferred to the machined surface, in which case it is concerned that the surface of the workpiece to be machined becomes coarse.

Therefore, it is an object of the present invention to provide a machine tool and a plastic forming method capable of smoothly machining a surface of a workpiece.

In a first aspect of the present invention, a machine tool is provided with a tool spindle and a work table for supporting a workpiece for performing a plastic forming on the workpiece with a tool attached to the tool spindle by relatively moving the tool spindle and the work table. The tool has a curved portion at least at a part of a side face thereof, and the machine tool comprises a moving mechanism configured to relatively move the tool spindle relative to the workpiece, a motor configured to relatively turn the tool spindle relative to the workpiece, a movement control unit configured to control the moving mechanism so that the tool is moved along a surface of the workpiece to be machined while the curved portion is pressed on the surface to be machined, and a turn control unit configured to control the motor so that a normal line of the curved portion at a reference position taken as a reference is oriented toward the surface of the workpiece to be machined.

In a second aspect of the present invention, a plastic forming method performs a plastic forming on a workpiece with a tool attached to a tool spindle by using a machine tool provided with the tool spindle and a work table for supporting the workpiece and by relatively moving the tool spindle and the work table. The tool has a curved portion at least at a part of a side face, and the machine tool is provided with a moving mechanism configured to relatively move the tool spindle relative to the workpiece and a motor configured to relatively turn the tool spindle relative to the workpiece. The method comprises a movement control step of controlling the moving mechanism so that the tool is moved along the surface of the workpiece to be machined while pressing the curved portion on the surface to be machined, and a turn control step of controlling the motor so that a normal line of the curved portion at a reference position taken as a reference is oriented toward the surface of the workpiece to be machined.

According to the present invention, it is possible to provide the machine tool and the plastic forming method capable of smoothly machining the surface of the workpiece.

The above and other objects, features, and advantages of the present invention will become more apparent from the following description when taken in conjunction with the accompanying drawings, in which a preferred embodiment of the present invention is shown by way of an illustrative example.

DESCRIPTION OF THE PREFERRED EMBODIMENTS

Hereinafter, a machine tool and a plastic forming method according to the present invention will be described in detail based on a preferred embodiment with reference to the accompanying drawings.

[Configuration of Machine Tool]

Figure 1:
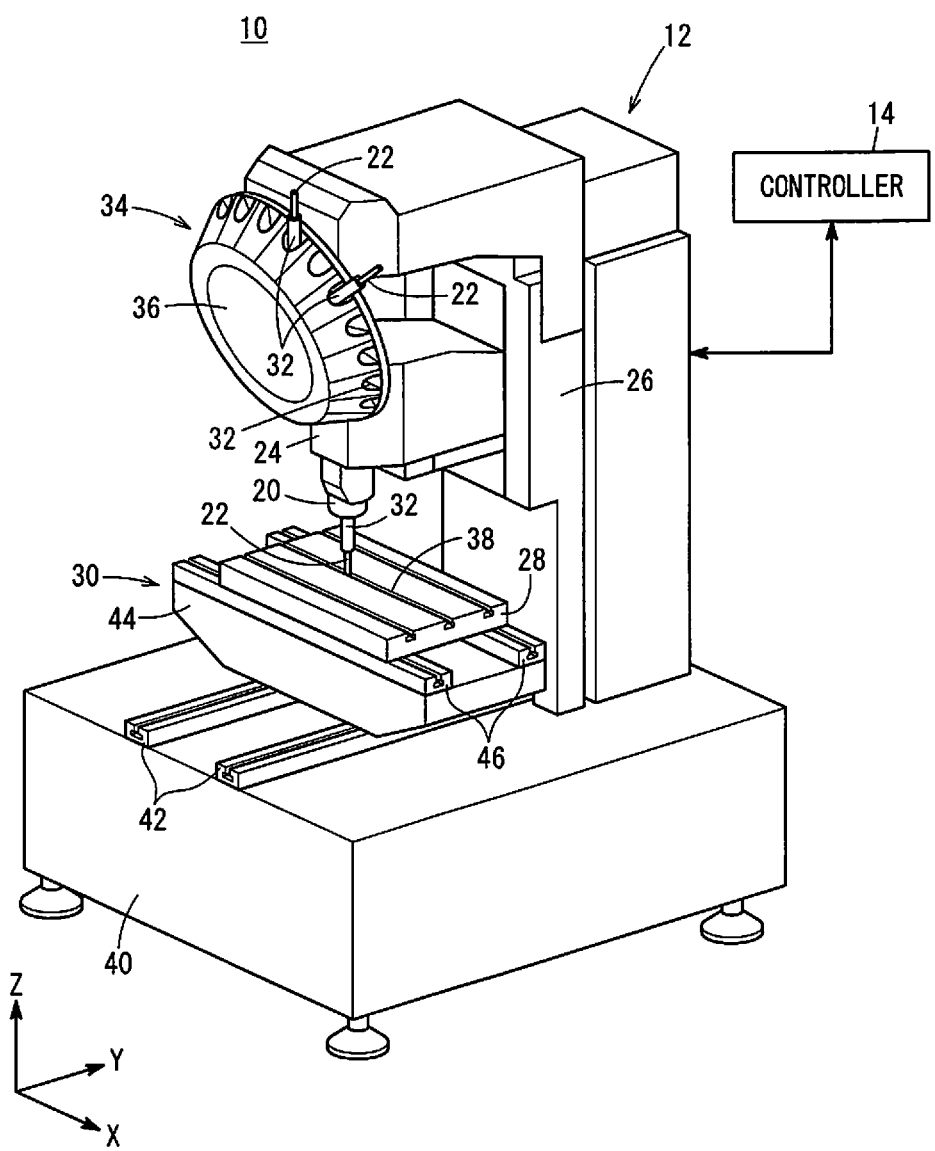
FIG. 1 is a schematic perspective view of a machine tool according to one embodiment of the present invention.

FIG. 1 is a schematic perspective view of a machine tool 10. The machine tool 10 is equipped with a machine tool body 12 and a controller 14 for controlling the machine tool body 12. The machine tool body 12 and the controller 14 are capable of wire or wireless communication with each other.

[Configuration of Machine Tool Body]

The machine tool body 12 has a tool spindle 20 and performs a plastic forming to plastically deform a machined surface of a workpiece W by pressing a tool 22 attached to the tool spindle 20 on the surface to be machined. In addition to the tool spindle 20, the machine tool body 12 has a spindle head 24, a column 26, a work table 28 and table drive units 30.

The tool 22 used for plastic forming has a cylindrical shape and is attachable to the tool spindle 20 through a tool holder 32 detachable from the tool spindle 20. The tool holder 32 may have an anti-vibration mechanism such as a hydraulic chuck or the like. The tool 22 attached to the tool spindle 20 through the tool holder 32 has its longitudinal axis extending along the tool spindle 20, and the tool spindle 20 and the tool 22 are rotated together. The machine tool body 12 is configured as a machining center in which the tool 22 attached to the tool spindle 20 is changeable by an automatic tool changer 34. The automatic tool changer 34 has a tool magazine 36 capable of storing (holding) a plurality of tools 22 each held by the tool holder 32.

The work table 28 fixably supports the workpiece W (see FIG. 2) and is disposed under the tool spindle 20. A plurality of T-shape slots 38 extending straight in an X-direction are formed on an upper surface of the work table 28 at predetermined intervals in a Y-direction. The workpiece W is fixed at a desired position on the table 28 through fixing jigs (not shown). The fixing jigs utilize the T-shape slots 38 to fix the workpiece W on the upper surface of the work table 28. Incidentally, the X-direction and the Y-direction are mutually orthogonal.

The table drive units 30 are mechanisms for moving the work table 28 in the X-direction and the Y-direction and are supported on a base 40. The table drive units 30 have a Y-axis sliding unit 42, a saddle 44 and an X-axis sliding unit 46. The saddle 44 is supported on the base 40 through the Y-axis sliding unit 42 movably in the Y-direction. The work table 28 is supported movably in the X-direction relative to the saddle 44 through the X-axis sliding unit 46.

Figure 2:
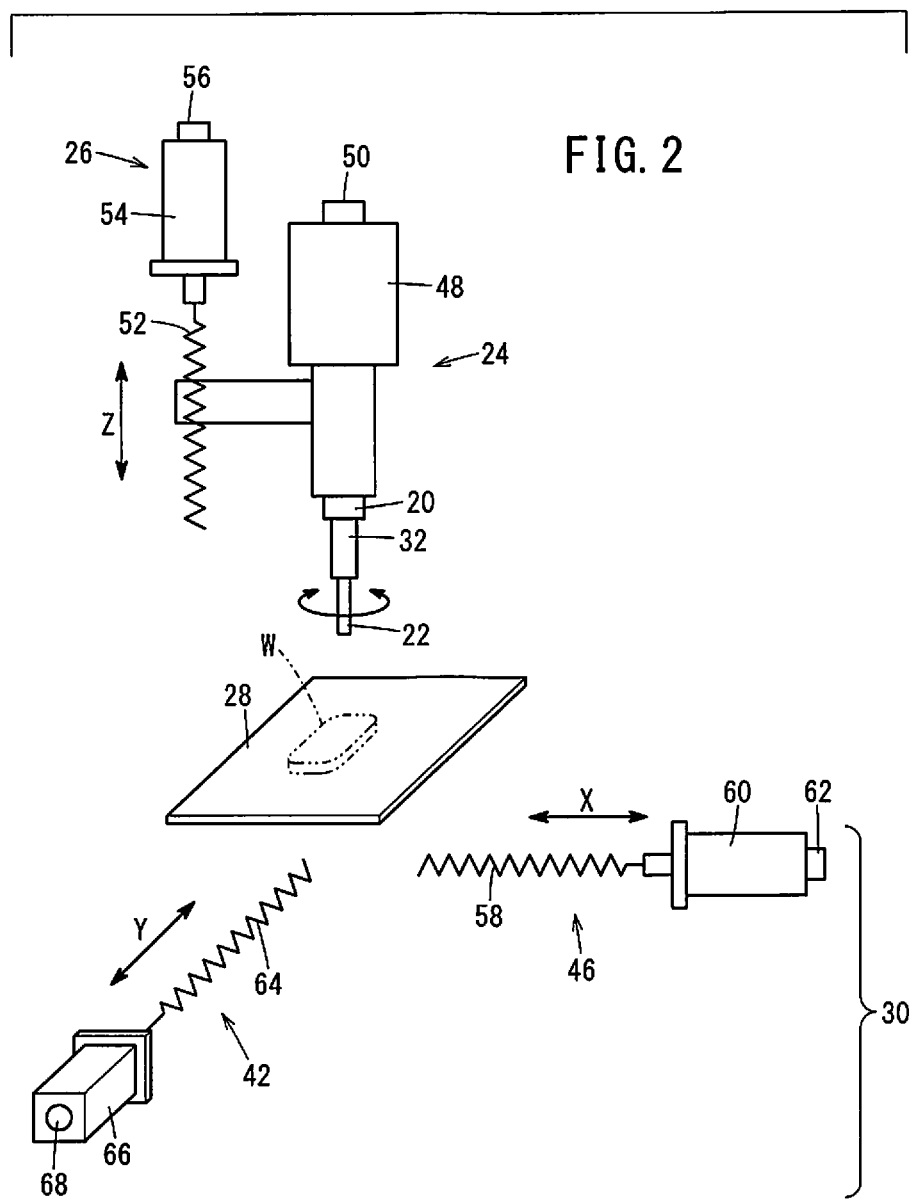
FIG. 2 is a diagram explaining drive systems of a tool spindle and a work table of the machine tool shown in FIG. 1.

FIG. 2 is a diagram explaining drive systems for the tool spindle 20 and the work table 28. The spindle head 24 is provided for rotatably driving the tool spindle 20 about a rotational axis extending in a Z-direction and has a spindle rotating motor 48 for rotationally driving the tool spindle 20. The spindle rotating motor 48 is used for controlling the phase (i.e., turn position) of the tool spindle 20. The spindle rotating motor 48 is provided with an encoder 50 for detecting the turn position of the spindle rotating motor 48.

The column 26 supports the spindle head 24 movably in the Z-direction (vertical direction) and has a spindle head feed unit 52 for moving the spindle head 24 in the Z-direction and a spindle feed motor 54 for driving the spindle head feed unit 52. The spindle feed motor 54 is provided with an encoder 56 for detecting the rotational position of the spindle feed motor 54. Incidentally, the Z-direction is orthogonal to the X-direction and the Y-direction. In short, the X-direction, the Y-direction and the Z-direction are orthogonal to one another.

The X-axis sliding unit 46 of the table drive units 30 has an X-axis feed unit 58 for moving the work table 28 in the X-direction and an X-axis feed motor 60 for driving the X-axis feed unit 58. The X-axis feed motor 60 is provided with an encoder 62 for detecting the rotational position of the X-axis feed motor 60.

The Y-axis sliding unit 42 of the table drive units 30 has a Y-axis feed unit 64 for moving the X-axis sliding unit 46 (work table 28) in the Y-direction and a Y-axis feed motor 66 for driving the Y-axis feed unit 64. The Y-axis feed motor 66 is provided with an encoder 68 for detecting the rotational position of the Y-axis feed motor 66.

With the table drive units 30 thus configured, it is possible to move the work table 28 in the X-direction and the Y-direction. Under the movements of the work table 28 in the X-direction and the Y-direction and by the movement of the tool spindle 20 in the Z-direction, the tool 22 attached to the tool spindle 20 becomes movable along the surface of the workpiece W to be machined fixed on the work table 28 while pressing its side face portion (curved portion) on the surface to be machined. Incidentally, the spindle rotating motor 48, the spindle feed motor 54, the X-axis feed motor 60 and the Y-axis feed motor 66 are driven under the control of the controller 14.

[Configuration of Control Device]

Figure 3:
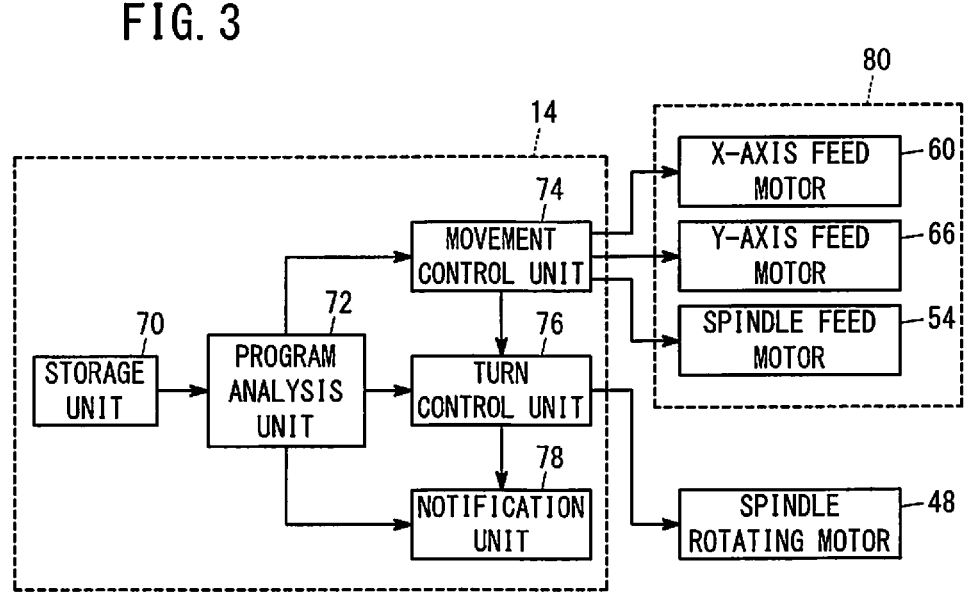
FIG. 3 is a block diagram of a controller shown in FIG. 1.

FIG. 3 is a block diagram of the controller 14. The controller 14 has a storage unit 70, a program analysis unit 72, a movement control unit 74, a turn control unit 76 and a notification unit 78. Further, although not shown, the controller 14 also has an input unit for enabling the operator to input information, commands and the like and a display unit and the like for displaying information necessary for the operator.

The storage unit 70 stores therein a plastic forming program and the like. The plastic forming program is a program including information on commands and the like necessary for the plastic forming of the workpiece W and is read out by the program analysis unit 72. The program analysis unit 72 analyzes the plastic forming program read out from a storage medium and gives the analysis result to the movement control unit 74 and the turn control unit 76.

The movement control unit 74 controls a moving mechanism 80 based on the analysis result by the program analysis unit 72. The moving mechanism 80 is provided for moving the tool spindle 20 relative to the workpiece W and includes the aforementioned X-axis feed motor 60, Y-axis feed motor 66 and spindle feed motor 54.

That is, the movement control unit 74 suitably controls the X-axis feed motor 60, the Y-axis feed motor 66 and the spindle feed motor 54 to move the tool spindle 20 relative to the workpiece W. By the movements like this, the tool 22 attached to the tool spindle 20 becomes a state in which the side face portion (curved portion) is pressed on a machining start position of the workpiece W fixed on the work table 28.

In this state, the movement control unit 74 suitably controls the X-axis feed motor 60 and the Y-axis feed motor 66 to move the work table 28 in an X-Y plane. As a result of this movement, the tool spindle 20 is moved relative to the workpiece W fixed on the work table 28, and thus, the tool 22 attached to the tool spindle 20 is moved to a machining end position along the surface of the workpiece W to be machined while pressing its side face portion (curved portion) on the surface to be machined. As a result, the workpiece W is plastically deformed.

In this manner, the movement control unit 74 controls the moving mechanism 80 so that the tool 22 is moved along the surface of the workpiece W to be machined from the machining start position to the machining end position while pressing the side face portion (curved portion) of the tool 22 on the surface to be machined.

Further, when having moved the tool 22 from the machining start position to the machining end position by controlling the moving mechanism 80, the movement control unit 74 gives the turn control unit 76 end-of-machining information indicating the termination of one cycle of plastic forming.

Figure 4:
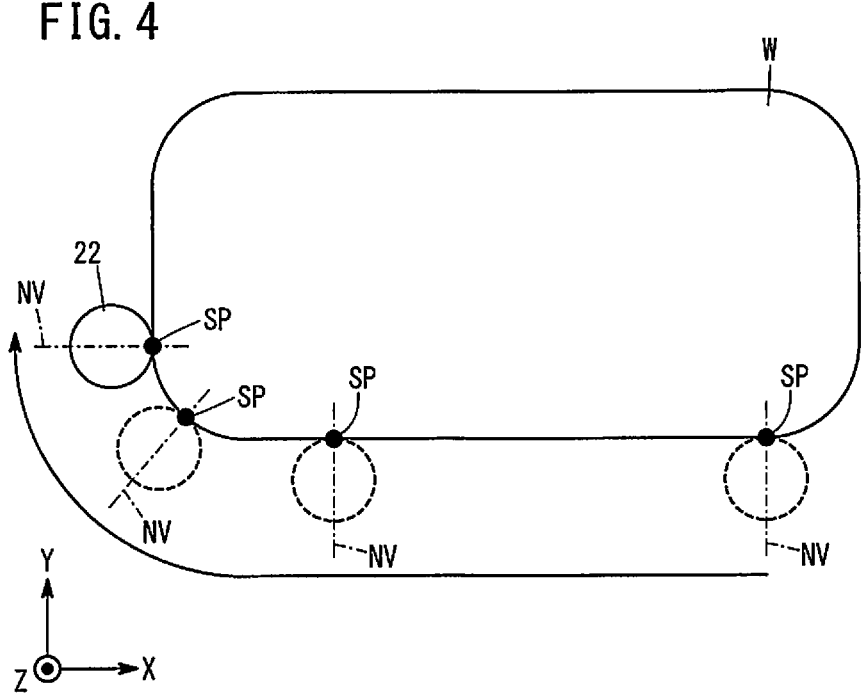
FIG. 4 is a diagram depicting a state of a tool moving along a surface of a workpiece to be machined under the control of the controller shown in FIG. 3.

The turn control unit 76 controls the spindle rotating motor 48 based on the analysis result at the program analysis unit 72. FIG. 4 is a diagram depicting the state of the tool 22 moved along the surface of the workpiece W to be machined under the control of the controller 14. For the sake of simplified explanations, the workpiece W is assumed as a rectangular parallelepiped shape with rounded corners, and the surface of the workpiece W to be machined is assumed as lateral surfaces in the X-direction and the Y-direction. It is to be noted that FIG. 4 illustrates the workpiece W and the tool 22 on a plane as viewed from the tool spindle 20.

The turn control unit 76 controls the spindle rotating motor 48 in conjunction with the table 28 moved in the X-Y plane by the movement control unit 74. Thus, at a reference position SP taken as a reference, a normal line NV of the side face portion (curved portion) of the tool 22 attached to the tool spindle 20 is oriented toward the surface of the workpiece W to be machined. Accordingly, even in the case where the surface of the workpiece W to be machined is curved, the tool 22 is moved along the surface of the workpiece W to be machined while always keeping pressing the reference position SP of the side face portion (curved portion) on the surface to be machined. Incidentally, the normal line NV at the reference position SP is a normal line at the side face portion (curved portion) of the tool 22 being in contact with the surface of the workpiece W to be machined.

In this manner, the turn control unit 76 controls the spindle rotating motor 48 so that at the reference position SP taken as a reference, the normal line NV of the side face portion (curved portion) of the tool 22 is oriented toward the surface of the workpiece W to be machined.

Further, the turn control unit 76 counts the number of times of plastic forming based on the machining end information given from the movement control unit 74 and sets a new reference position SP at a position differing from the previously set position each time plastic forming of a predetermined number of times is ended.

Figure 5:
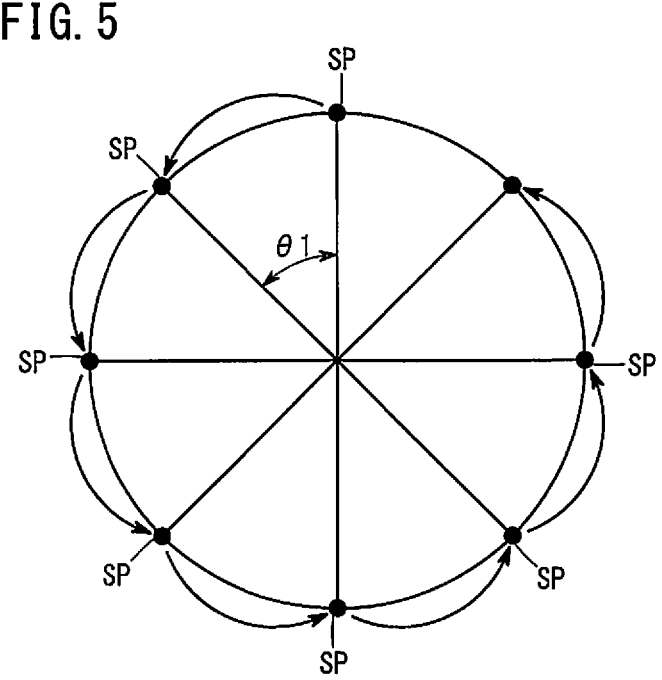
FIG. 5 is a diagram depicting setting state (1) of a reference position set by the controller shown in FIG. 3.

FIG. 5 is a diagram depicting setting state (1) of the reference position SP set by the controller 14. In the case of the present embodiment, the turn control unit 76 sets a new reference position SP at a position which is shifted by a predetermined angle θ1 in the circumferential direction of the tool 22 from the position which has been set as the reference position SP in the latest plastic forming of the predetermined number of times. Accordingly, when setting the new reference position SP, the turn control unit 76 controls the spindle rotating motor 48 to orient the normal line NV of the tool 22 at the newly set reference position SP toward the surface of the workpiece W to be machined.

Figure 6:
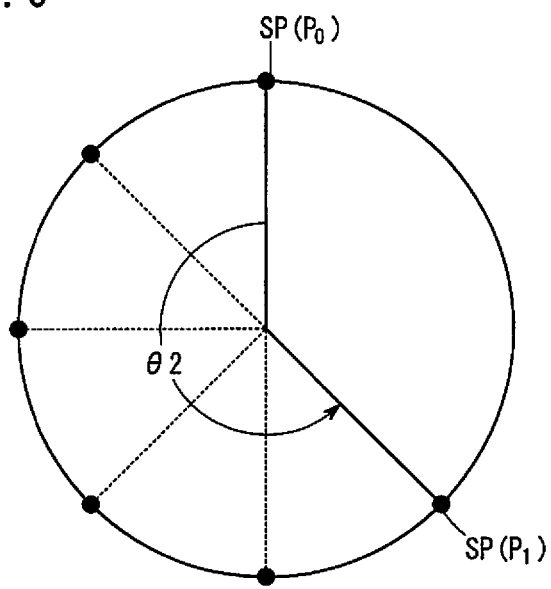
FIG. 6 is a diagram depicting setting state (2) of the reference position set by the controller shown in FIG. 3.

FIG. 6 is a diagram depicting setting state (2) of the reference position SP set by the controller 14. When setting the new reference position SP, the turn control unit 76 calculates an angle θ2 between the position $P_1$ set as the current reference position SP and the position $P_0$ having been initially set as the reference position SP. If the angle θ2 exceeds 360 degrees, the turn control unit 76 generates a notification command and gives the generated notification command to the notification unit 78.

The notification unit 78, when given the notification command from the turn control unit 76, notifies that the tool 22 should be replaced. Examples of notification from the notification unit 78 include a display method for displaying on a display unit, a sound generation method for generating an alarm from a sound generator, a light generation method for generating a light from a lamp such as a warning light or the like. The notification may be used in combination.

[Plastic Forming Processing]

Figure 7:
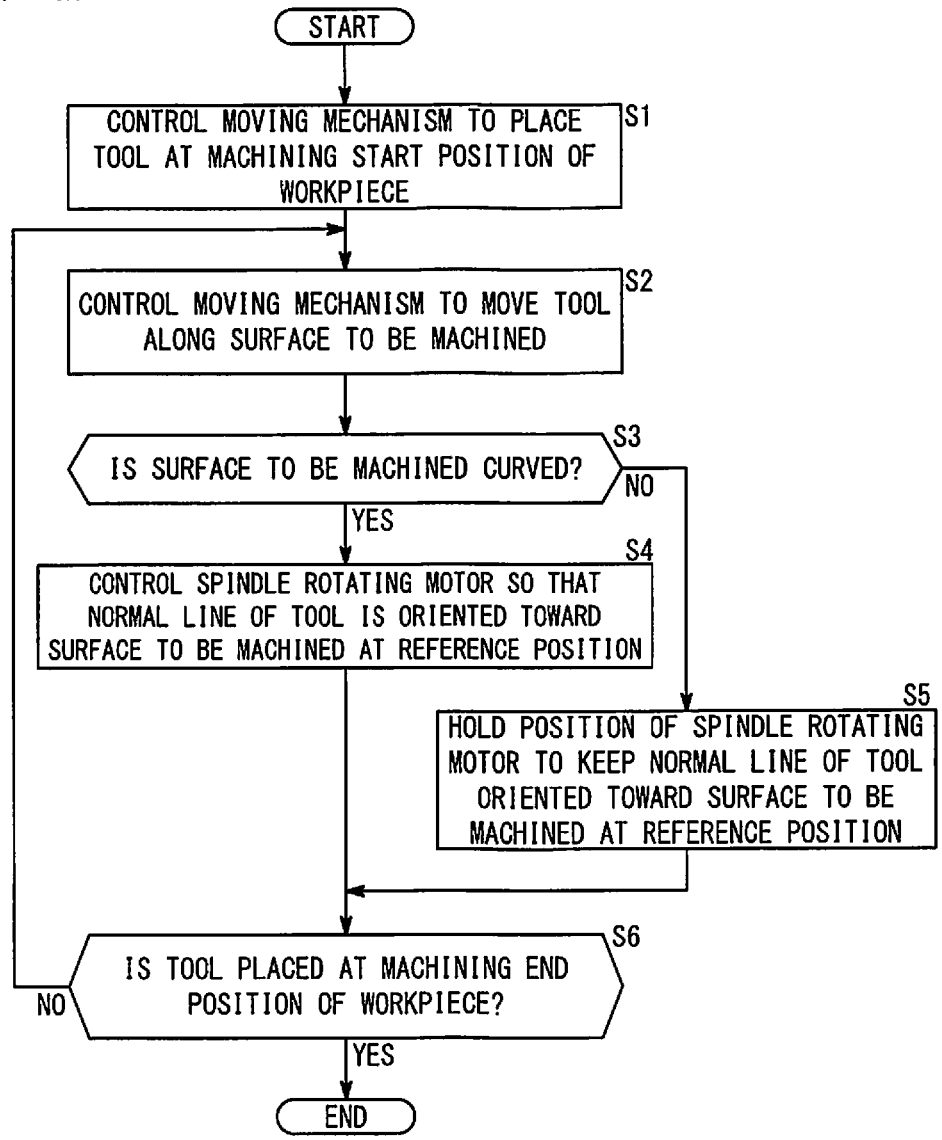
FIG. 7 is a flowchart showing the flow of a plastic forming process executed based on an analysis result of a plastic forming program in the controller shown in FIG. 3.

FIG. 7 is a flowchart showing the flow of a plastic forming process executed based on an analysis result of a plastic forming program in the controller 14. At step S1, the movement control unit 74 controls the moving mechanism 80 so that the tool 22 is placed with the side face portion of the tool 22 pressed on a machining start position on the surface of the workpiece W to be machined. Also at step S1, the turn control unit 76 sets as an initial reference position SP an arbitrary position of the contact portion between the surface to be machined and the side face portion (curved portion) of the tool 22 which has been pressed on the machining start position by the movement control unit 74, and the process goes to step S2.

At step S2, the movement control unit 74 controls the moving mechanism 80 so that the tool 22 is moved along the surface of the workpiece W to be machined while pressing the side face portion of the tool 22 on the surface to be machined, and the process goes to step S3. At step S3, the turn control unit 76 recognizes whether the surface to be machined along which the tool 22 moves is curved or flat. Here, the process goes to step S4 if the turn control unit 76 recognizes that the surface to be machined along which the tool 22 moves is curved, or to step S5 if the turn control unit 76 recognizes that the surface to be machined is flat.

At step S4, the turn control unit 76 controls the spindle rotating motor 48 in conjunction with the control of the moving mechanism 80 so that the normal line NV at the reference position SP having been set at step S1 is oriented toward the surface of the workpiece W to be machined, and the process goes to step S6. At step S5, the turn control unit 76 holds the position of the spindle rotating motor 48 by exciting the spindle rotating motor 48 so that the normal line NV at the reference position SP having been set at step S1 is continued to be oriented toward the surface of the workpiece W to be machined, and the process goes to step S6.

At step S6, the movement control unit 74 recognizes whether or not the tool 22 is placed at a machining end position on the surface of the workpiece W to be machined. Here, if the tool 22 has not reached the machining end position yet, the process returns to step S2, at which the movement control unit 74 is continued to control the aforementioned moving mechanism 80.

On the other hand, if the tool 22 is placed at the machining end position, the movement control unit 74 controls the moving mechanism 80 to move the tool 22 from the surface of the workpiece W to be machined to a predetermined standby position. The turn control unit 76 increments its count value of the plastic forming by one. As a result, the plastic forming process is ended.

[Reference Position Setting Processing]

Figure 8:
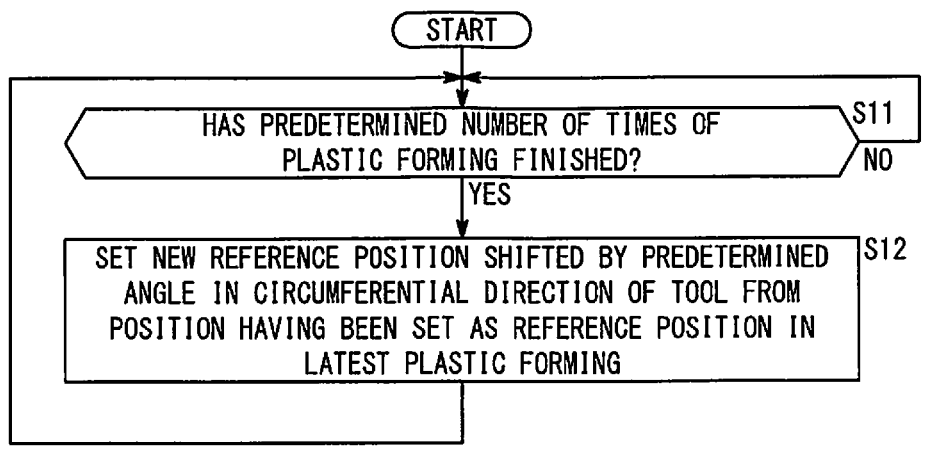
FIG. 8 is a flowchart showing the flow of a reference position setting processing executed based on the analysis result of the plastic forming program in the controller shown in FIG. 3.

FIG. 8 is a flowchart showing the flow of a reference position setting processing executed based on the analysis result of the plastic forming program in the controller 14. At step S11, the turn control unit 76 recognizes whether the plastic forming has been performed the predetermined number of times, and the process goes to step S12 if the plastic forming have been performed the predetermined number of times.

At step S12, the turn control unit 76 sets a new reference position SP at a position which is shifted by a predetermined angle θ1 in the circumferential direction of the tool 22 from the position which has been set as the reference position SP in the latest plastic forming of the predetermined number of times. Subsequently, the process returns to step S11, at which the turn control unit 76 waits to recognize that the plastic forming has been performed the predetermined number of times.

[Notification Processing]

Figure 9:
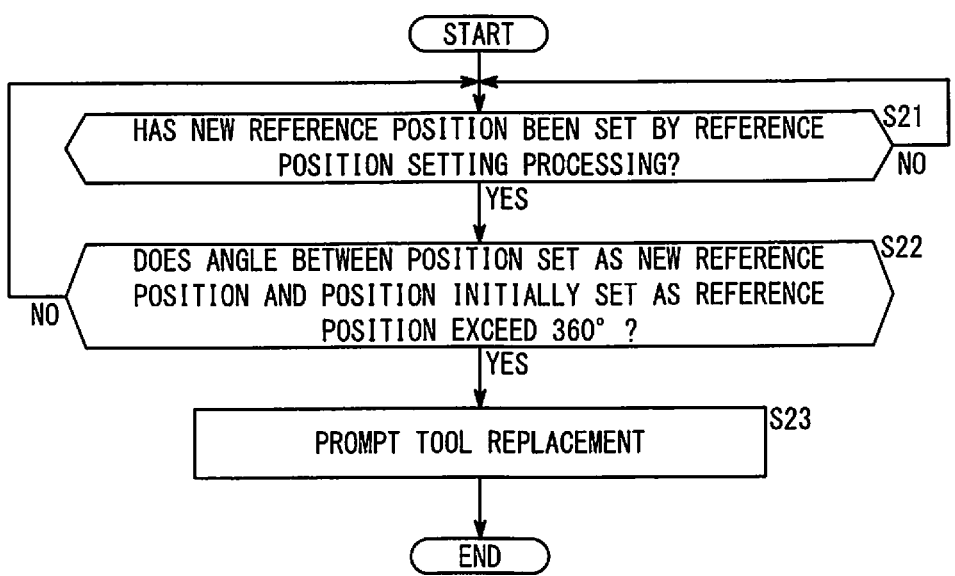
FIG. 9 is a flowchart showing the flow of a notification processing executed based on the analysis result of the plastic forming program in the controller shown in FIG. 3.

FIG. 9 is a flowchart showing the flow of a notification processing executed based on the analysis result of the plastic forming program in the controller 14. At step S21, the turn control unit 76 recognizes whether or not a new reference position SP has been set by the reference position setting processing, and the process goes to step S22 if the new reference position SP has been set.

At step S22, the turn control unit 76 calculates an angle θ2 between the position $P_1$ having been set as the new reference position SP by the reference position setting processing and the position $P_0$ having been initially set as the reference position SP, and the process goes to step S23 if the angle θ2 exceeds 360 degrees. At step S23, the notification unit 78 notifies that the tool 22 should be replaced. Subsequently, the notification processing ends.

[Effects and Advantages]

As described hereinabove, the machine tool 10 according to the present embodiment controls the moving mechanism 80 so that the tool 22 attached to the tool spindle 20 is moved along the surface of the workpiece W to be machined while pressing its side face portion (curved portion) on the surface to be machined. At this time, in the machine tool 10, the spindle rotating motor 48 is controlled to orient the normal line NV of the side face portion (curved portion) of the tool 22 toward the surface to be machined at the reference position SP taken as a reference. In short, the machine tool 10 keeps a constant rotational phase of the spindle rotating motor 48 relative to the surface to be machined.

With this configuration, the machine tool 10 according to the present embodiment is able to plastically deform the machined surface of the workpiece W by pressing the side face portion (curbed portion) of the tool 22 without moving the tool 22 while rotating the tool spindle 20 throughout the entire circumference of the tool spindle 20. Therefore, according to the machine tool 10 in the present embodiment, vibrations that would otherwise be generated by rotation of the tool spindle 20 and transferred to the machined surface can be avoided throughout the entire circumference of the tool spindle 20, and hence a smoother machined surface can be achieved.

In the case where the tool 22 is moved without driving the spindle rotating motor 48 so as to keep the rotational position fixed, a machining-action portion on the tool which is moved while being pressed on the surface of the workpiece W to be machined changes at a curved portion of the surface to be machined. For this reason, in the case where the tool 22 is attached to the tool spindle 20 with itself inclined, the inclination of the tool 22 being pressed changes at the curved portion of the surface to be machined, and thus, the machined surface tends to be uneven as the inclination changes. In contrast, in the machine tool 10 according to the present embodiment, its normal line NV at the reference position SP is always oriented toward the surface to be machined by the control of the spindle rotating motor 48, and thus, even when the tool 22 is inclined relative to the tool spindle 20, the inclination of the tool 22 pressed by the curved portion of the surface to be machined is kept unchanged. Accordingly, it is possible to prevent the machined surface from becoming uneven due to inclination of the tool 22 relative to the tool spindle 20, and hence to achieve a smoother machined surface.

First Modification

Although dry machining has been descried as an example in the foregoing embodiment, wet machining is also applicable. In this case, a cutting fluid supply device is provided for supplying a cutting fluid between the tool 22 and the workpiece W.

Second Modification

Although the work table 28 is configured to be moved in the X-Y plane in the foregoing embodiment, the tool spindle 20 (the spindle head 24) may be configured to be moved in the X-Y plane. That is, the tool spindle 20 (the spindle head 24) may be moved in the X-direction and the Y-direction.

Third Modification

Although the work table 28 is not provided with any rotational shaft in the foregoing embodiment, the work table 28 may be provided with a rotational shaft. In the case where the work table 28 is provided with the rotational shaft, the controller 14 may control a motor for the rotational shaft so that the normal line NV of the side face portion (curved portion) of the tool 22 is oriented toward the surface to be machined at the reference position SP taken as a reference. In this case, the controller 14 keeps the spindle rotating motor 48 fixed without driving. That is, at step S4 in FIG. 7, the turn control unit 76 controls the motor for the rotation of the work table 28 in conjunction with the control of the moving mechanism 80 so that the normal line NV at the reference position SP having been set at step S1 is oriented toward the surface of the workpiece W to be machined. Further, at step S5 in FIG. 7, the turn control unit 76 keeps the rotational position of the work table 28 by exciting the motor for rotation of the work table 28 so that the normal line NV at the reference position SP having been set at step S1 is continued to be oriented toward the surface of the workpiece W to be machined. In this way, as a motor for turning the tool spindle 20 relative to the workpiece W, the spindle rotating motor 48 may be used. Alternatively, a motor may be additionally provided to turn the rotational shaft provided on the work table 28.

Forth Modification

Although the tool 22 is a cylindrical shape in the forgoing embodiment, the cross-sectional shape of the tool 22 may be formed in a teardrop shape, an elliptical shape or the like. In short, any tool may be usable as far as its side face is at least partially curved. Further, the surface roughness of the curved portion is recommended to be 1.0 μm or less. The lower the surface roughness on the curved portion of the tool 22 is, the smoother the machined surface can be. Incidentally, the surface roughness can be measured by a measuring method conforming to a predetermined standard. For example, in the case of conforming to the standard of JIS 0601-1976, the surface roughness is measured as the ten-point average roughness (Rz).

Fifth Modification

Although each position of the tool 22 shifted in the circumferential direction is set as the reference position SP in the foregoing embodiment, positions shifted in the longitudinal direction of the tool 22 may each be set as the reference position SP. Alternatively, positions which are shifted in direction extending helically about the center axis of the tool 22 may each be set as the reference position SP.

Sixth Modification

The foregoing first to fifth modifications may be arbitrarily combined unless any inconsistency arises. [Technical Concept or Idea] The technical ideas obtained from the foregoing embodiment and the foregoing first to sixth modifications will be described hereafter.

[First Technical Idea]

A machine tool (10) provided with a tool spindle (20) and a work table (28) for supporting a workpiece (W) for performing a plastic forming on the workpiece (W) with a tool (22) attached to the tool spindle (20) by relatively moving the tool spindle (20) and the work table (28), wherein the tool (22) has a curved portion at least at a part of a side face thereof, and the machine tool comprises a moving mechanism (80) configured to move the tool spindle (20) relative to the workpiece (W), a motor (48) configured to turn the tool spindle (20) relative to the workpiece (W), a movement control unit (74) configured to control the moving mechanism (80) so that the tool (22) is moved along a surface to be machined of the workpiece (W) while the curved portion is pressed on the surface to be machined of the workpiece (W), and a turn control unit (76) configured to control the motor (48) so that a normal line (NV) of the curved portion is oriented toward the surface of the workpiece (W) to be machined at a reference position (SP) taken as a reference.

With this configuration, it is possible to plastically deform the machined surface without rotating the tool spindle (20) throughout the entire circumference of the tool spindle (20), so that vibration that would otherwise be caused by the rotation and transferred to the machined surface can be avoided. As a result, it is possible to smoothly machine the surface of the workpiece (W).

The turn control unit (76) may be configured to set the reference position (SP) at a position differing from a previously set position each time plastic forming is ended a predetermined number of times. With this arrangement, it is possible to widen the machining-action portion of the tool (22) in comparison with the case that the reference position (SP) is not shifted. As a consequence, it is possible to smoothly machine the surfaces of a greater number of workpieces (W).

The curved portion may be formed in an arc shape, and the tool (22) may have a cylindrical shape. With this configuration, it is possible to smoothly machine the surface of the workpiece (W).

The turn control unit (76) may be configured to set a new reference position (SP) at a position which is shifted by a predetermined angle in the circumferential direction of the tool (22) from a position which has been set as the reference position (SP) in the latest plastic forming of the predetermined number of times. With this arrangement, it is possible to smoothly machine the surface of the workpiece (W).

The machine tool (10) may be further provided with a notification unit (78) configured to notify that the tool (22) should be replaced in the case where an angle between a position set as the new reference position (SP) and a position having been set initially as the reference position (SP) exceeds 360 degrees. It is possible to prompt replacement of the tool (22) to ensure high machining accuracy easily.

The surface roughness of the curved portion may be made to be 1.0 μm or less. The lower the surface roughness on the curved portion of the tool (22) is, the smoother the machined surface can be.

[Second Technical Idea]

A plastic forming method for performing a plastic forming on a workpiece (W) with a tool (22) attached to a tool spindle (20) by using a machine tool (10) provided with the tool spindle (20) and a work table (28) for supporting the workpiece (W) and by relatively moving the tool spindle (20) and the work table (28), wherein the tool (22) has a curved portion at least at a part of a side face thereof, and the machine tool (10) is provided with a moving mechanism (80) configured to move the tool spindle (20) relative to the workpiece (W) and a motor (48) configured to turn the tool spindle (20) relative to the workpiece (W), and the method comprises a movement control step of controlling the moving mechanism (80) so that the tool (22) is moved along the surface of the workpiece (W) to be machined while pressing the curved portion on the surface to be machined of the workpiece (W), and a turn control step of controlling the motor (48) so that a normal line (NV) of the curved portion is oriented toward the surface of the workpiece (W) to be machined at a reference position (SP) taken as a reference.

With this arrangement, it is possible to plastically deform the machined surface without rotating the tool spindle (20) throughout the entire circumference of the tool spindle (20) and to avoid vibrations that would otherwise be caused by the rotation and transferred to the machined surface. As a result, it is possible to smoothly machine the surface of the workpiece (W).

The turn control step may include setting the reference position (SP) at a position differing from a previously set position each time plastic forming is ended a predetermined number of times. With this arrangement, it is possible to widen the machining-action portion of the tool (22) in comparison with the case that the reference position (SP) is not shifted. As a consequence, it is possible to smoothly machine the surfaces of a greater number of workpieces (W).

The curved portion may be formed in an arc shape, and the tool (22) may have a cylindrical shape. With this configuration, it is possible to smoothly machine the surfaces of the workpiece (w).

The turn control step may include setting a new reference position (SP) at a position shifted by a predetermined angle in the circumferential direction of the tool (22) from a position which has been set as the reference position (SP) in the latest plastic forming of the predetermined number of times. With this configuration, it is possible to smoothly machine the surface of the workpiece (W).

The method may further include a notification step of notifying that the tool (22) should be replaced in the case where an angle between a position set as the new reference position (SP) and a position having been set initially as the reference position (SP) exceeds 360 degrees. With this configuration, it is possible to prompt replacement of the tool (22) to ensure high machining accuracy easily.

The surface roughness of the curved portion may be made to be 1.0 μm or less. The better the surface roughness on the curved portion of the tool (22) is, the smoother the machined surface can be. With this configuration, it is possible to smoothly machine the surface of the workpiece (W).

Although certain preferred embodiments of the present invention have been shown and described in detail, it should be understood that various changes and modifications may be made therein without departing from the scope of the appended claims.

What is claimed is:

1. A machine tool provided with a tool spindle and a work table for supporting a workpiece for performing a plastic forming on the workpiece with a tool attached to the tool spindle by relatively moving the tool spindle and the work table, wherein:

the tool has a curved portion at least at a part of a side face thereof; and the machine tool comprises:
- a moving mechanism configured to move the tool spindle relative to the workpiece;
- a motor configured to turn the tool spindle relative to the workpiece;
- a movement control unit configured to control the moving mechanism so that the tool is moved along a surface of the workpiece to be machined while the curved portion is pressed on the surface of the workpiece to be machined; and
- a turn control unit configured to control the motor so that a normal line of the curved portion is oriented toward the surface of the workpiece to be machined at a reference position that touches the surface of the workpiece to be machined when machining starts, wherein the tool is rotated to maintain the same side face of the tool in contact with the surface of the workpiece, such that the side face of the tool does not rotate relative to the surface of the workpiece.

2. The machine tool according to claim 1, wherein the turn control unit is configured to set the reference position at a position differing from a previously set position each time plastic forming is ended a predetermined number of times.

3. The machine tool according to claim 1, wherein the curved portion is formed in an arc shape.

4. The machine tool according to claim 3, wherein the turn control unit is configured to set a new reference position at a position shifted by a predetermined angle in the circumferential direction of the tool from a position which has been set as the reference position in a latest plastic forming of the predetermined number of times.

5. The machine tool according to claim 4, wherein the tool has a cylindrical shape.

6. The machine tool according to claim 5, further comprising a notification unit configured to notify that the tool should be replaced in a case where an angle between a position set as the new reference position and a position having been set initially as the reference position exceeds 360 degrees.

7. The machine tool according to claim 1, wherein a surface roughness of the curved portion is 1.0 μM or less.

8. A plastic forming method for performing a plastic forming on a workpiece with a tool attached to a tool spindle by using a machine tool provided with the tool spindle and a work table for supporting the workpiece and by relatively moving the tool spindle and the work table, wherein:

the tool has a curved portion at least at a part of a side face thereof; and the machine tool is provided with a moving mechanism configured to move the tool spindle relative to the workpiece and a motor configured to turn the tool spindle relative to the workpiece;

the method comprising:
- a movement control step of controlling the moving mechanism so that the tool is moved along a surface of the workpiece to be machined while pressing the curved portion on the surface to be machined; and
- a turn control step of controlling the motor so that a normal line of the curved portion is oriented toward the surface of the workpiece to be machined at a reference position that touches the surface of the workpiece to be machined when machining starts, wherein the tool is rotated to maintain the same side face of the tool in contact with the surface of the workpiece, such that the side face of the tool does not rotate relative to the surface of the workpiece.

9. The plastic forming method according to claim 8, wherein the turn control step includes setting the reference position at a position differing from a previously set position each time plastic forming is ended a predetermined number of times.

10. The plastic forming method according to claim 8, wherein the curved portion is formed in an arc shape.

11. The plastic forming method according to claim 10, wherein the turn control step includes setting a new reference position at a position shifted by a predetermined angle in the circumferential direction of the tool from a position which has been set as the reference position in a latest plastic forming of the predetermined number of times.

12. The plastic forming method according to claim 11, wherein the tool has a cylindrical shape.

13. The plastic forming method according to claim 12, further comprising a notification step of notifying that the tool should be replaced in a case where an angle between a position set as the new reference position and a position having been set initially as the reference position exceeds 360 degrees.

14. The plastic forming method according to claim 8, wherein a surface roughness of the curved portion is 1.0 μm or less.

* * * * *